Patented Apr. 7, 1942

2,278,455

UNITED STATES PATENT OFFICE 2,278,455

FIRE RESISTANT COMPOSITION

Harry K. Linzell, Ingleside, and Joseph W. Gill, Elmhurst, Ill., assignors to United States Gypsum Company, Chicago, Ill., a corporation of Illinois No Drawing. Application November 18, 1938, Serial No. 241,229

8 Claims. (Cl. 106—63)

The present invention relates to a fire-resistant composition which is composed of a setting substance such, for example, as calcined gypsum, and a fusible glass-like material.

One of the objects of the invention is to produce a fire-resistant plaster composition.

A further object of the invention is to produce cast articles from calcined gypsum and a glass-like fusible substance, which articles are capable of withstanding the destructive action of fire and flame, so that, under the influence of the temperatures reached in a fire, resulting in the calcination of the gypsum, the articles will not disintegrate but rather will set up by reason of the fusing of the glass-like body, with resultant preservation of their shape and retention of at least a portion of their initial strength.

A further object of the invention is to produce fired products by incorporating a fusible glass-like substance with a cementitious material, such as calcined gypsum, to produce cast or molded objects from said mixture, preferably by hydrating the mixture with a sufficient quantity of water, drying, and subsequently firing the cast objects thus produced at a temperature sufficient to dehydrate the gypsum or other cementitious material and, at the same time, to bring about a fritting together of the cementitious particles by means of the glass-like binder which, under influence of applied heat, fuses and melts, thus serving as a binding agent.

Still a further object of the invention is to produce articles of the ceramic type by mixing calcined gypsum with powdered glass, adding water to the resultant mixture to gauge the same, casting the resultant slurry into forms in which it is allowed to remain and become hard, drying the objects thus produced and then subjecting them to firing at temperatures which lie within the range beginning at the calcination point of the gypsum and upwardly to, say, 2000° F.

The fundamental concept of the present invention resides in the discovery that the fire resistance of a set mass of gypsum such, for example, as a gypsum partition tile or a gypsum wallboard, or other building material of this nature, may be considerably enhanced by providing for the presence therein of a fusible but incombustible body which, in case the gypsum articles should be subjected to fire, will fuse and serve to bond the gypsum particles together so as to prevent the disintegration of the article.

For the production of the first or primary material, it suffices to mix together, mechanically, comminuted calcined gypsum such, for example, as ordinary plaster of Paris or any special type of calcined gypsum, such as the type known as "alpha gypsum," which is specifically described in the patent to Randel and Dailey, No. 1,901,051, or a completely dehydrated gypsum product such as Keene's cement, soluble anhydrite, or the like, with an incombustible fusible substance having the characteristics of a glass or enamel frit. This admixture of glass-like material may be in any proportion from 5% to 50%, but experiments have demonstrated that about 25% gives satisfactory results.

The applicability of the present invention to the building industry may be exemplified in the form of a plaster which may be sold as such, to be admixed and applied by the user, or in the form of pre-made articles such as wallboard, plaster board, partition tile, and the like. Gypsum products, while incombustible, are nevertheless subject to destruction by fire because of the fact that the temperature encountered in a conflagration is more than sufficient to effect a calcination of the gypsum; that is to say, the heat drives the water of constitution or crystallization out of the gypsum molecule. The product resulting from such calcination is no longer sufficiently coherent to support a load.

It has long been an object to produce a plaster which would be more resistant to the influence of fire, and this object has now been attained as a result of the present invention.

In its simplest embodiments the invention therefore contemplates the production of a mixture of calcined gypsum, which may be either hemihydrate or a form of anhydrite capable of combining with water and setting, and a fusible incombustible substance in the nature of a glass, which may be either ordinary comminuted or finely ground glass or, preferably, a low melting flux material particularly made for the purpose. For example, it is possible to use a composition made up of the following components fused together at red heat and finally quenched in water and ground:

|  | Per cent |
|---|---|
| Slag (blast furnace) | 30 |
| Silica | 45 |
| Borax | 12.5 |
| Soda ash | 12.5 |

The amount of this glass-like material to be used in making a fire-resistant plaster composition will vary from 5% to 25%, but usually 10% is found to be sufficient for the purpose of producing a fire-resistant plaster. This mixture of finely powdered glass-like material may be used like ordinary plaster except that it has a somewhat lower consistency; that is to say, it requires somewhat less water to gauge it than does the gypsum without the admixture of the glass. If such a plaster containing a glass-like substance is applied to a wall, as for example upon laths or, preferably, upon expanded metal lathing, it will set thereon in the usual manner, the glass in no way interfering with the setting of the gypsum.

If, however, a fire subsequently should break out in the room provided with such walls, the heat of the fire will calcine the gypsum, driving out its water of crystallization; but because of the particularly low melting point of this glass-like material, which is on the order of about 900° to 1800° F., the glass will fuse or soften and will serve to cement together the individual particles of calcined gypsum, thereby preventing the destruction of the plastered wall and serving as a retardant to the conflagration. The plaster may be sanded in accordance with conventional practice or used unsanded. If sand is used, greater fire resistance may be expected. It will, therefore, be seen that the first product produced in accordance with the present invention has individual utility and novelty.

It will require no long description to enable any one to appreciate that one can take the plaster composition just described, gauge it with water, and then either mold it or cast it into finished articles to be employed in a building. For example, one can make cast partition tile, slabs, or wallboard, the last-mentioned usually being faced on both sides with heavy paper or cardboard. The fire-retarding effect of this set composition in a tile, slab or wallboard is, of course, the same as in the case of the plastered wall. It therefore follows that the cast articles containing the glass-like material likewise possess individual novelty and utility.

In place of the particular glass or frit, the formula of which has just been disclosed, it is, of course, possible to use finely ground scrap glass having a relatively low softening point; or, in case material having a very low fusing point is required, it is possible to use a borax glass. The main object of the invention is, therefore, attained when the plaster mixture or the gauged product resulting from said admixture contains a material which, though incombustible, has a melting point that lies intermediate the calcining point of gypsum and ordinary fire temperatures, or approximately 2000° F.

The third aspect of the invention concerns itself with a burnt or fired product of the ceramic type which results from deliberate firing of the articles produced by gauging the mixture of a fusible substance with water, allowing it to set and dry. This produces a light-colored, strong, resistant and substantially water-insoluble ceramic mass which has great utility, as it may be used for the production of cast or molded articles which may serve as bearing blocks, tile, various molded objects, insulator plugs, switch bases, acoustic tile, and the like. The strength and fusing point of such a ceramic mixture lies fairly accurately within the control of the manufacture, depending to a great extent upon the fusing point of the glass-like binder employed and the quantity of the latter present in the finished article. Using, for example, a glass or frit of the composition already described, namely:

| | Per cent |
|---|---|
| Slag (blast furnace) | 30 |
| Silica | 45 |
| Borax | 12.5 |
| Soda ash | 12.5 |

This mixture may be fused at about 2100° F., quenched in water, ground, and then pulverized in a pebble mill. The powder is then mixed with calcium sulfate hemihydrate, Keene's cement, or other anhydrous setting type of gypsum, the mixture is gauged with water and then cast into the shape of the desired object.

As an exemplification of the properties of the products thus obtained, it may be stated that an ordinary gypsum stucco mixture containing 5% of the glass or frit, gauged, allowed to set, dried, and then fired at 1800° F., yields a product which is considerably harder than the original cast product but can still be scratched with a knife. It will be found to absorb about 10% of water but is not disintegrated thereby.

By increasing the quantity of glass present to 10%, the final product after firing is very much harder than the original set material, in fact so much harder that it cannot be scratched with a knife, while its water absorption has dropped to about 3%.

By increasing the percentage of glass or frit to 25%, a final fired product is obtained which has a ceramic tile-like hardness, is fairly well vitrified, and may be employed for various purposes for which ordinary ceramic ware is now used.

As a further exemplification of the invention, the properties of a particularly excellent mixture may be stated to be as follows:

| | Parts by weight |
|---|---|
| Commercial gypsum stucco | 90 |
| Ball-milled glass or frit | 10 |
| Water | 37 |

This produced a mixture sufficiently fluid for casting and was cast into test bars 8 inches long, 1 inch wide, and ½ inch thick. A number of these test bars were made and then allowed to become air-dry, whereupon they were fired at a temperature ranging between 970° F. up to and including 1800° F., individual test bars being removed from time to time at the following temperatures: 970° F., 1520° F., and 1800° F. The burned test bar removed at 970° F. was found to be not as hard as the dried, unburned sample, and showed a shrinkage of 1.6%. The temperature of the furnace containing the test bars was allowed to remain at 970° F. to 1050° F. during a period of about twelve hours, was then slowly raised to 1175° F. and eventually to 1520° F., at which time another sample was removed. This sample was found to be as hard as the original and showed a shrinkage of 8.75%. The sample removed at 1800° F. was very hard and dense and showed a modulus of rupture of 1615 pounds per square inch. The unfired blank test bar showed a modulus of rupture of 980 pounds per square inch. This shows that the fired product is actually stronger than the unfired product, showing the excellent bond obtained by the glass-like binder. The water-absorption of this material is comparatively low and on immersion in water for one minute showed an absorption of water of .25%, two minutes—.5%, one hour—1.2%, while boiling for one hour and then allowing it to remain in the hot water over night showed a water absorption totaling 1.9%.

It will be evident from the foregoing that the new product has great utility and, because it can be made by the simplest type of machinery and by comparatively unskilled workmen, possesses very great commercial potentialities. By reason of the fact that the mixture of glass-like frit or binder with the gypsum may be accomplished in ordinary mixers or by grinding the material simultaneously in a ball mill, because the casting of the individual pieces may be accomplished mechanically—as in a standard tile molding plant, because the material after setting can rapidly be removed from the molds and allowed to dry without particular precautions, and furthermore because the firing temperatures can be controlled as may be desired and may have a fairly wide range, it will be seen that the process of manufacturing these articles lends itself to large-scale production with means now available in practically all ceramic plants.

A good type of flux may be made by taking natural slag as it comes from the furnace—for example, a steel furnace or iron furnace—and adding thereto, while still molten, the desired amount of borax, soda ash, or even ordinary sodium chloride, so as to lower the melting point of the slag, whereupon the slag may be granulated by running it into cold water and then ground into powder. If a particularly low-melting frit or glass is required, the addition of lead oxides such as red lead, white lead or litharge will yield low-melting lead-containing glasses, the softening point of which may be as low as 500° to 600° F. The invention is, therefore, not to be circumscribed by the melting point of the incombustible binder but rather is to be interpreted in the light of the hereunto appended claims, in which the term "glass" is used in the broad sense to connote an inorganic incombustible fusible substance having a rather broad softening and melting point range; in other words, a substance which will soften progressively as the temperature to which it is subjected increases.

We claim:

1. A fired ceramic product comprising particles of calcined gypsum bonded by a glass-like binder.

2. A fired ceramic product comprising particles of calcined gypsum bonded by a binder consisting substantially of a glass.

3. A fired ceramic product comprising particles of calcium sulfate bonded by glass.

4. A fired ceramic product comprising particles of calcium sulfate bonded by a binder having a fusing point intermediate the calcining temperature of gypsum and 2000° F.

5. The process of producing a ceramic article which comprises mixing calcined gypsum with a substance having a fusing point between the calcining temperature of gypsum and ceramic-firing temperatures, gauging the resultant mixture with water and casting the slurry into molds and allowing it to set therein, drying the casts thus obtained, and firing the same.

6. The process of producing a ceramic article which comprises forming a casting of a calcined gypsum slurry containing a comminuted substance having a fusing point intermediate the calcining temperature of gypsum and ceramic-firing temperatures, drying said casting, and heating the same to the fusing temperature of said substance.

7. The process claimed in claim 6 in which the comminuted substance is a glass.

8. The process of forming a solid fire-resistant object which comprises mixing powdered glass and powdered calcium sulfate hemihydrate, combining the mixture thus produced with sufficient water to hydrate said hemihydrate, forming the resulting mass into shape, drying said shaped article and heating it to about the melting point of said glass, and then allowing it slowly to cool to atmospheric temperature.

HARRY K. LINZELL.
JOSEPH W. GILL.